S. JOHNSON.
Fountain Watering-Trough for Cattle.
No. 198,744. Patented Jan. 1, 1878.
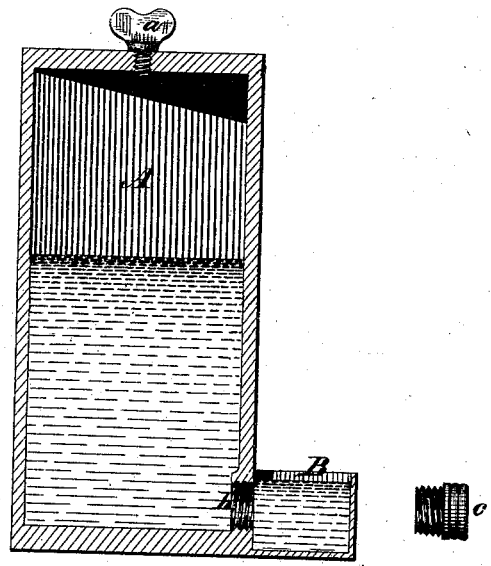
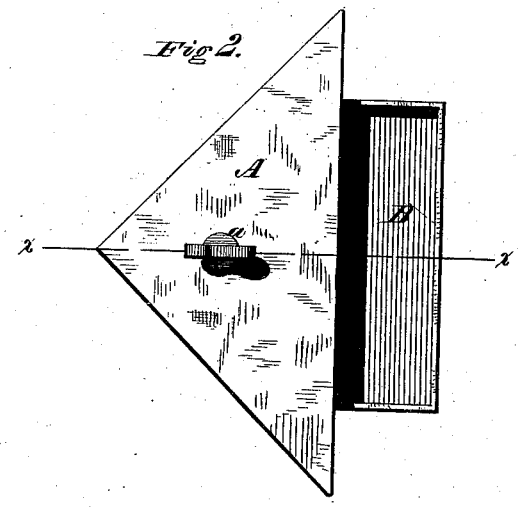

UNITED STATES PATENT OFFICE.

SAMUEL JOHNSON, OF PHILADELPHIA, PENNSYLVANIA.

IMPROVEMENT IN FOUNTAIN WATERING-TROUGHS FOR CATTLE.

Specification forming part of Letters Patent No. 198,744, dated January 1, 1878; application filed November 7, 1877.

*To all whom it may concern:*

Be it known that I, SAMUEL JOHNSON, of Philadelphia, in the county of Philadelphia and State of Pennsylvania, have invented certain new and useful Improvements in Cattle-Car Watering-Troughs; and I do hereby declare that the following is a full, clear, and exact description thereof, which will enable others skilled in the art to which it appertains to make and use the same reference being had to the accompanying drawings, and to letters of reference marked thereon, which form a part of this specification, and in which—

Figure 1 is a vertical section of my improved cattle-car watering-trough, taken through the dotted line $x$ $x$ of Fig. 2, with the screw-plug of its discharging-aperture shown removed to a contiguous point; and Fig. 2 is a plan view thereof.

Corresponding parts in the two figures are denoted by like letters.

This invention relates to a certain improvement in that class of cattle-watering troughs adapted particularly for use in connection with cattle-transporting cars; and it consists, principally, of an upright receptacle or tank provided with a trough, and having a supplying-aperture and a discharging-aperture, the latter aperture, through which water is supplied to the trough, being so arranged with reference to the trough as not to allow the water to rise above or overflow it, substantially as hereinafter more fully set forth.

In shipping or transporting cattle by rail it is not infrequent that they are shut up for days from water, and consequently become exhausted, and perhaps die from thirst. It is the object of my invention to provide against these disadvantages.

In the annexed drawing, A marks an upright receptacle or tank for holding water. It is preferably made of a triangular shape in transverse section, so as to fit snugly in the corner of the car in connection with which it is to be used, and to present its trough to the cattle to the best advantage, and to enable it to occupy the least possible space.

In the upper part or top of the tank A is an aperture fitted with a screw-plug, $a$, and through which the tank is filled or supplied with water.

B marks a trough supplied to the lower front part of the receptacle or tank A, to hold the water for the cattle to drink. $b$ is an aperture in the tank A, fitted with a screw-plug, $c$, and through which water is discharged from the tank into the trough. The aperture $b$ is so arranged with reference to the trough B that its upper edge stands a little below that of the trough, in order to prevent the water rising above or overflowing the latter, and running upon the car-floor.

It will be observed, also, that as the cattle are drinking, a fresh supply of water will take the place of that consumed, as at the moment the surface of the water sinks below any portion of the aperture $b$ by reason of its consumption, an additional flow of water from the tank will take place, and again fill the trough.

It will be further observed from the foregoing that the filling of the trough is performed automatically.

What I claim is—

1. A cattle-car watering-trough consisting of the receptacle or tank A, provided at its lower end with a trough, B, and having a supplying-aperture and a discharging-aperture, $b$, the latter-mentioned aperture being so arranged with reference to the trough B that its upper edge stands slightly below that of the trough, substantially as and for the purpose set forth.

2. A cattle-car watering-trough consisting of the receptacle or tank A, in transverse section of a triangular shape, and provided with the trough B, and having a supplying-aperture and a discharging-aperture, arranged substantially as shown and described, and for the purpose set forth.

In testimony that I claim the foregoing as my own I hereto affix my signature in presence of two witnesses.

SAMUEL JOHNSON.

Witnesses:
MARY E. JOHNSON,
SARAH M. JOHNSON.